United States Patent [19]

Heiney et al.

[11] Patent Number: 5,983,243
[45] Date of Patent: Nov. 9, 1999

[54] DATA PROCESSING SYSTEM AND METHOD FOR PREPARING A PRESENTATION-READY DOCUMENT THAT PRODUCES SEPARATE IMAGES OF FIXED AND VARIABLE DATA AND A BOOKTICKET SPECIFYING AN ARRANGEMENT OF SUCH IMAGES

[75] Inventors: Ronald Heiney, Longmont; Anthony Stuart, Boulder, both of Colo.; Mahesh Viswanathan, Yorktown Heights, N.Y.

[73] Assignee: International Business Machines Corporation, Armonk, N.Y.

[21] Appl. No.: 08/741,007

[22] Filed: Oct. 31, 1996

[51] Int. Cl.$^6$ .................................................. G06F 11/22
[52] U.S. Cl. ................................................................ 707/500
[58] Field of Search .................................... 707/500, 530, 707/508, 511, 515, 526; 345/115, 116, 133; 382/290

[56] References Cited

U.S. PATENT DOCUMENTS

| | | |
|---|---|---|
| 4,965,763 | 10/1990 | Zamora . |
| 5,165,014 | 11/1992 | Vassar . |
| 5,241,464 | 8/1993 | Greulich et al. . |
| 5,251,289 | 10/1993 | Fidler et al. . |
| 5,325,484 | 6/1994 | Motoyama ............................... 395/162 |
| 5,353,388 | 10/1994 | Motoyama ............................... 395/117 |
| 5,390,354 | 2/1995 | De Heus et al. . |
| 5,422,992 | 6/1995 | Motoyama et al. . |
| 5,436,627 | 7/1995 | Motoyama et al. . |
| 5,437,024 | 7/1995 | French . |
| 5,467,441 | 11/1995 | Stone et al. . |
| 5,469,532 | 11/1995 | Gerlach et al. . |
| 5,469,533 | 11/1995 | Dennis . |
| 5,471,563 | 11/1995 | Dennis et al. . |
| 5,471,564 | 11/1995 | Dennis et al. . |
| 5,473,741 | 12/1995 | Neufelder et al. . |
| 5,754,766 | 5/1998 | Shaw et al. ........................... 395/200.3 |

OTHER PUBLICATIONS

N. Coskun and J. Wang, "Generating Compact Postscript Files for Both Display and Printing", IBM Technical Disclosure Bulletin, vol. 35, No. 4B, pp. 110–111, 1992.

B.E. Haan Et Al., "Incremental Filters", IBM Technical Disclosure Bulletin, vol. 38, No. 9, p. 169, 1995.

D.R. Palmer, "Using PostScript Resources in Advanced Function Printing", IBM Technical Disclosure Bulletin, vol. 38, No. 1, pp. 287–288, 1995.

*Primary Examiner*—Joseph H. Feild
*Assistant Examiner*—Alford W. Kindred
*Attorney, Agent, or Firm*—Monica D. Lee; Brian F. Russell; Andrew J. Dillon

[57] ABSTRACT

A data processing system and method of preparing a presentation-ready document are described. In response to receipt of a document description that includes at least one Page Description Language (PDL) instruction and specifies both fixed data and variable data, the one or more PDL instructions are processed to produce separate presentation-ready images of the fixed data and the variable data. In addition, a bookticket specifying an arrangement of the presentation-ready images of the fixed data and the variable data is automatically generated. In response to receipt of the bookticket, a presentation-ready document is built that includes the presentation-ready images of the fixed data and the variable data in the arrangement specified by the bookticket. In one embodiment of the present invention, the document description specifies the fixed data of the document utilizing a PDL form operator.

20 Claims, 3 Drawing Sheets

DATA PROCESSING SYSTEM AND METHOD FOR PREPARING A PRESENTATION-READY DOCUMENT THAT PRODUCES SEPARATE IMAGES OF FIXED AND VARIABLE DATA AND A BOOKTICKET SPECIFYING AN ARRANGEMENT OF SUCH IMAGES

BACKGROUND OF THE INVENTION

1. Technical Field

The present invention relates in general to document presentation and in particular to the generation of a presentation-ready document within a data processing system. Still more particularly, the present invention relates to a data processing system and method for efficiently generating a presentation-ready document including both fixed and variable data, wherein a user is not required to manually specify how the fixed and variable data are to be merged.

2. Description of the Related Art

Many industries, for example, the publishing and direct marketing industries, rely heavily on high-speed, high-resolution, large-capacity printing. These industries often make use of so-called Print On Demand (POD) presentation environments that are capable of producing over 400 pages per minute (100 pages per minute in full color) at resolutions of 600 dots per inch or greater. The high performance requirements of a POD presentation environment necessitate the transfer of massive amounts of data to the printhead—on the order of 30 MB per second.

Information to be presented within a POD presentation environment is typically formatted as a document, which comprises both the collection of data objects that constitute the document's content and the resources and formatting specifications that dictate the processing functions to be performed on that content. Documents are constructed of one or more pages, and the pages in turn are made up of data objects such as bar code objects, graphics objects, image objects and presentation text. Each data object has associated layout information that directs the placement and orientation of the data object on the page, as well as the page width, page depth, and other format parameters. In addition to fixed data objects such as presentation text, which may be common to multiple copies of a document, POD architectures also typically support variable data objects, which can be unique to each copy (and each page of each copy) of a document.

Conventional POD presentation environments have typically handled documents including variable data inefficiently. For example, assume that a user desires to produce 100 copies of a one page document for which the fixed data objects in each copy are identical and the variable data objects in each copy are unique. In a conventional POD presentation system, the user first prepares, utilizing a desktop publishing or word processing application, a one page document including both the fixed data and a designation of a variable data area in which variable data objects are to be presented. The user also prepares either a second document or additional pages of the first document that specify the variable data objects. In response to an output command, the application merges the fixed and variable data objects into a lengthy Page Description Language (PDL) file, which specifies the content and format for each of the 100 pages to be printed. The PDL file is then transmitted to a Raster Image Processor (RIP) within the POD presentation system, which executes (hereinafter referred to as "rips") the PDL instructions within the document file in order to obtain 100 pages of dot patterns that are to appear on the physical print medium. Thereafter, the dot patterns are applied to the print medium by the printhead.

Although this prior art method of presenting documents including variable data is relatively simple from the user's perspective, it unnecessarily limits the performance of a POD presentation system by requiring the RIP to repetitively process the fixed data appearing on each of the 100 pages. In order to address this inefficiency, custom applications such as MERGEDOC (available from International Business Machines (IBM) Corporation of Armonk, N.Y.) were developed that permit a user to generate two separate PDL files: a fixed data object file and a variable data object file. In addition, such custom applications provide facilities that enable the user to manually build a "bookticket" that specifies how the fixed and variable data objects are to be merged. In POD presentation systems that employ a custom application, the manually-generated bookticket and the two PDL files are transmitted to the RIP, which processes each of the fixed and variable data objects once and stores the resulting dot patterns. The RIP then merges the variable data objects with the fixed data objects in accordance with the bookticket prepared by the user in order to obtain a presentation-ready document. Although custom applications enhance presentation efficiency by eliminating the need to rip fixed data objects multiple times, the use of custom applications entails a large amount of additional user input in order to specify how the fixed and variable data objects are to be merged.

As should thus be apparent, it would be desirable to provide an improved method and system for presenting documents within a POD presentation environment. In particular, it would be desirable to provide a method and system for automatically generating a presentation-ready document that do not require the user to manually build a bookticket specifying the manner in which the fixed and variable data are to be merged.

SUMMARY OF THE INVENTION

It is therefore one object of the present invention to provide an improved method and system for document presentation.

It is another object of the present invention to provide an improved method and system for generating a presentation-ready document within a data processing system.

It is yet another object of the present invention to provide an improved data processing system and method for efficiently generating a presentation-ready document including both fixed and variable data, wherein a user is not required to manually specify how the fixed and variable data are to be merged.

The foregoing objects are achieved as is now described. In response to receipt of a document description that includes at least one Page Description Language (PDL) instruction and specifies both fixed data and variable data, the one or more PDL instructions are processed to produce separate presentation-ready images of the fixed data and the variable data. In addition, a bookticket specifying an arrangement of the presentation-ready images of the fixed data and the variable data is automatically generated. In response to receipt of the bookticket, a presentation-ready document is built that includes the presentation-ready images of the fixed data and the variable data in the arrangement specified by the bookticket. In one embodiment of the present invention, the document description specifies the fixed data of the document utilizing a PDL form operator.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
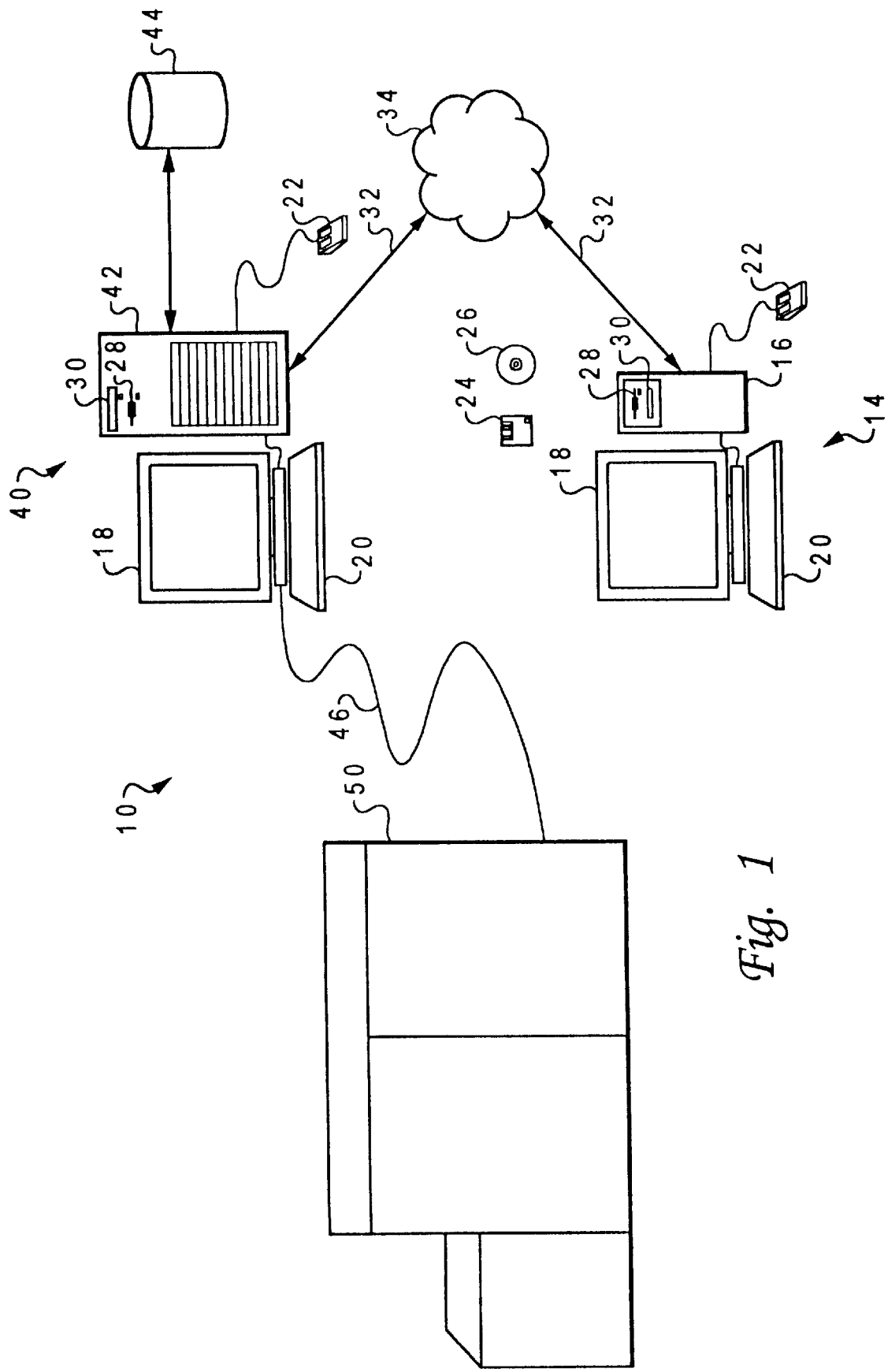
FIG. 1 depicts an illustrative embodiment of a data processing system, which comprises a Print On Demand (POD) presentation system in accordance with the present invention.

With reference now to the figures and in particular with reference to FIG. 1, there is depicted an illustrative embodiment of a data processing system in accordance with the present invention. As illustrated, data processing system 10 includes one or more computer systems 14, which each comprise a personal computer 16, a display device 18, a keyboard 20, and a mouse 22. In accordance with the present invention, a user of a computer system 14 can compose a presentation document utilizing one or more page layout or word processing applications such as Aldus Pagemaker™, Aldus Freehand™, Corel WordPerfect™, or Adobe Illustrator™. As will be appreciated by those skilled in the art, these desktop applications typically enable the user to determine the content and format of a presentation document through the entry of appropriate inputs via keyboard 20 and mouse 22. The desktop applications and presentation documents can be stored to and retrieved from removable media such as diskette 24 and optical disk 26, which can be accessed by diskette drive 28 and optical disk drive 30, respectively. Alternatively, a user can store desktop applications and presentation documents in nonvolatile storage provided within personal computer 16.

As illustrated, each computer system 14 is coupled via a communication link 32 to network 34, which can comprise a Local Area Network (LAN), Wide Area Network (WAN), or other computer network such as the Internet or World Wide Web. Utilizing one of a number of well-known communication programs, a user of computer system 14 can obtain a logical connection across network 34 to print server 40, which together with printer 50 comprises a Print On Demand (POD) presentation system. As indicated by like reference numerals, print server 40 includes a display device 18, keyboard 20, mouse 22, diskette drive 28, and optical disk drive 30 like those associated with computer system 14. However, instead of a personal computer 16, print server 40 includes a workstation 42, which preferably comprises a high performance multiprocessor computer such as the AS/400 and RISC System/6000 computers available from IBM. According to a preferred embodiment of the present invention, workstation 42 executes a Raster Image Processor (RIP) program, which in addition to translating each input Page Description Language (PDL) document file into one or more printable dot patterns, automatically generates a bookticket indicating the manner in which dot patterns derived from fixed and variable data are to be merged. In order to maximize the presentation throughput of printer 50, print server 40 further includes a disk cache 44 for storing documents to be raster image processed ("ripped") as well as presentation-ready documents to be printed by printer 50.

Printer 12, which is directly connected to print server 40 by cable 46, is a high-speed, large-capacity, high-resolution printer, such as the IBM 3170 and IBM 3900-D3 printers available from IBM. As described below, printer 50 receives presentation-ready documents (i.e., documents in raster image format) and presents the documents on a designated presentation medium.

Figure 2:
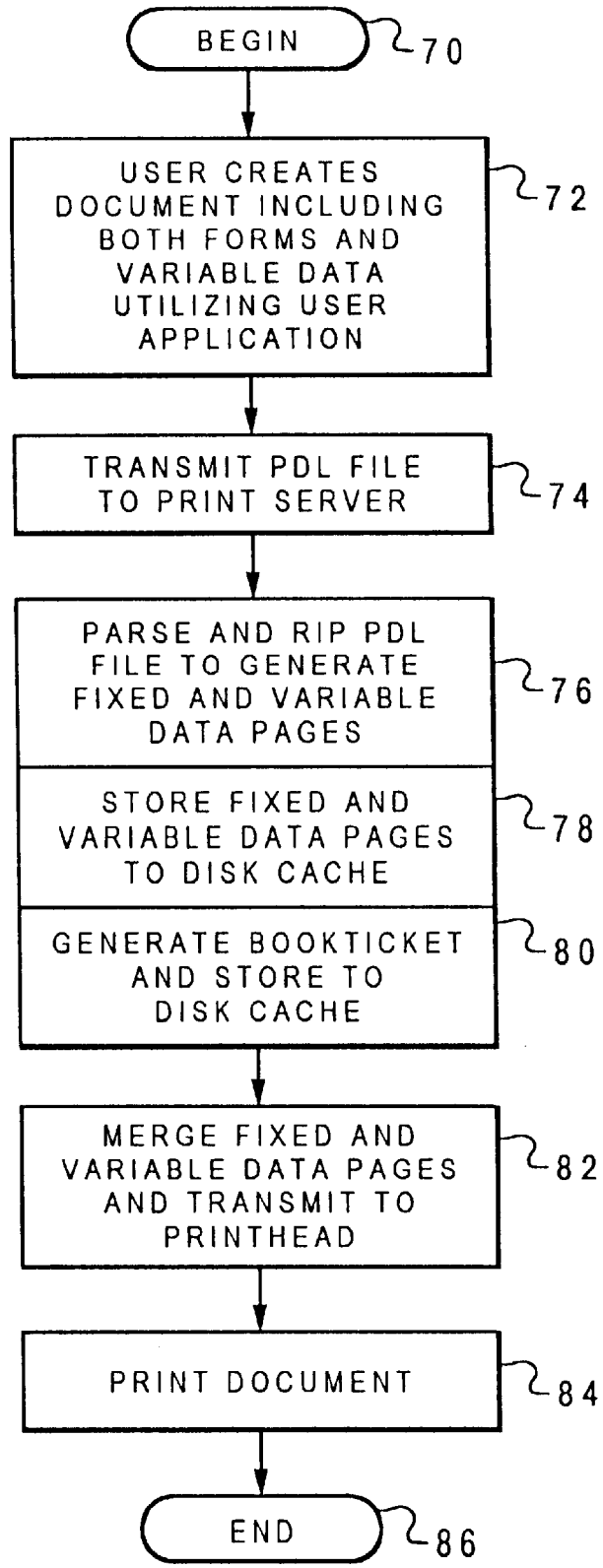
FIG. 2 is a high level logical flowchart illustrating a method of generating a presentation-ready document in accordance with the present invention.
Figure 3:
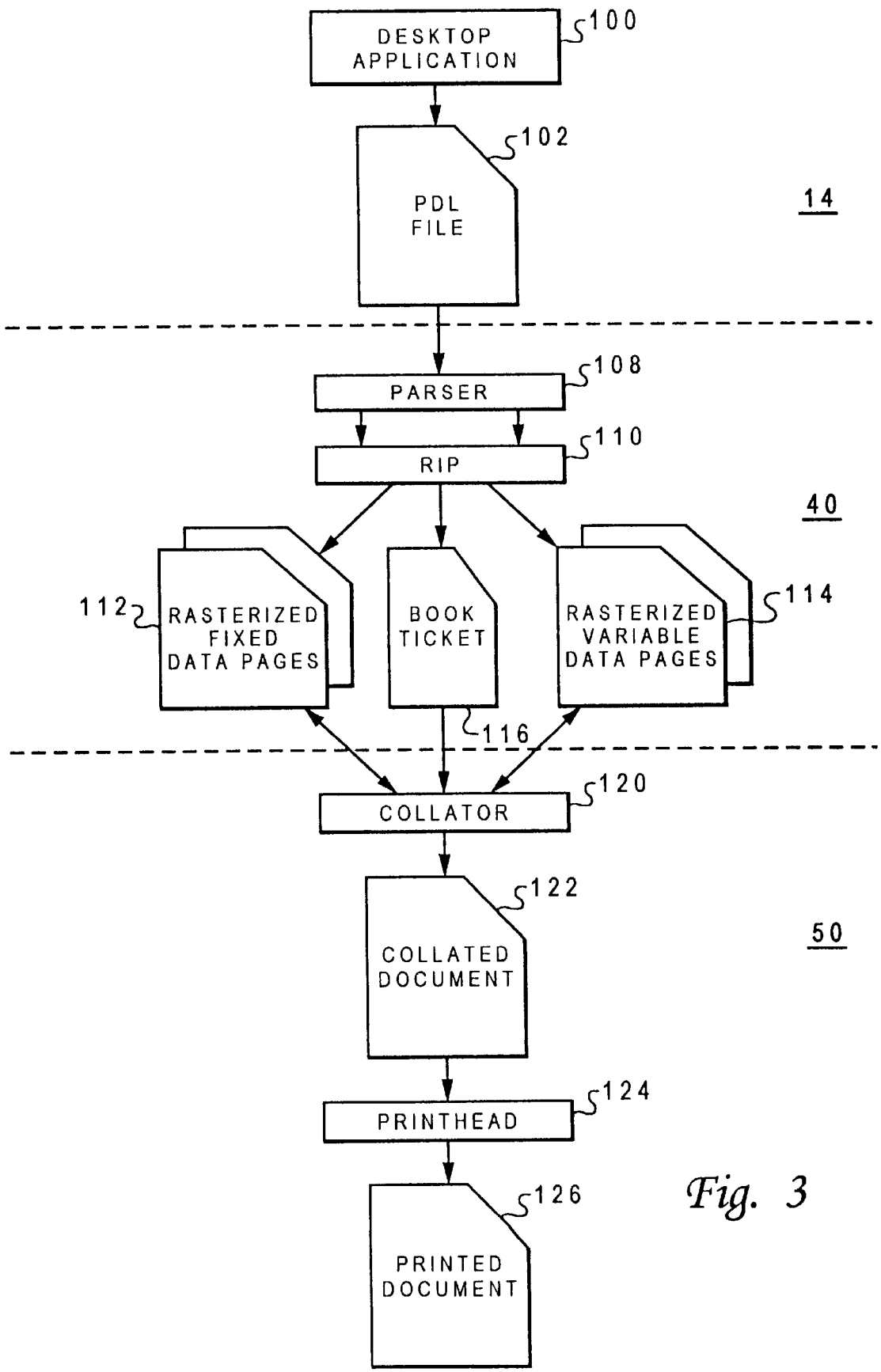
FIG. 3 depicts the data flow of document presentation within the data processing system illustrated in FIG. 1.

Referring now to FIGS. 2 and 3, there are illustrated a high level logical flowchart and a data flow diagram of the presentation of a document by printer 50. Although FIGS. 2 and 3 indicate that various steps within the document presentation process are performed by particular components of the POD presentation system, those skilled in the art will appreciate from the following description that many presentation functions can be alternatively incorporated into different components. With reference first to FIG. 2, the document presentation process begins at block 70 and thereafter proceeds to block 72, which depicts a user of computer system 14 creating a document including both fixed and variable data utilizing desktop application 100, which, as noted above, comprises a conventional desktop publishing or word processing application. As utilized herein, fixed data refers to invariant data, usually one page in length, that is to be utilized multiple times either in the same document or different documents. Variable data, on the other hand, is data of a specified class that can have multiple values. For example, a computer-generated tax form includes both fixed data, which comprises the tax form's instructions and answer blanks, and variable data, which includes the taxpayer' name, address, and other pertinent information.

In accordance with a preferred embodiment of the present invention, desktop application 100, which is depicted in FIG. 3, supports the use of the PostScript™ Level 2 form operator or other similar PDL instruction to define the fixed data. A PostScript™ form is a self-contained description of fixed data (e.g., arbitrary graphics, presentation text, or sampled images) that the user desires to output multiple times. In order to utilize a PostScript™ form, the user first creates a form dictionary that specifies information about the form. A form dictionary includes the following entries:

FormType: always set to 1

Extended Unique ID (XUID): unique identification of form instance

BBox: lower left and upper right coordinates of the form's bounding rectangle

Matrix: transformation matrix that maps the form's coordinate space into user space PaintProc: PostScript™ procedure that "paints" the form Implementation: implementation-dependent data that facilitates form caching by the RIP After a PostScript™ form has been defined by a form dictionary, the user utilizes the facilities of desktop application 100 to specify one or more forms to be included within the document. Desktop application 100 then builds a PostScript™ prolog for the document that contains the form name, form type, form dictionary identifier, and other form parameters of each specified form. The remainder of the document created utilizing desktop application 100 comprises one or more pages of user-specified variable data. The variable data are specified within the document utilizing PostScript™ instructions that associate the variable data objects with a particular form. Further details concerning the PostScript™ form operator and PostScript™ documents in general can be found in *PostScript™ Language Reference Manual,* Second Ed. (1990) by Adobe Systems, Inc., Mountain View, Calif.

Still referring to FIG. 2, following the creation of the document utilizing desktop application 100, the process proceeds from block 72 to block 74, which illustrates the user transmitting a PDL file output by desktop application 100 to print server 40 across network 34. As depicted in FIG. 3, in the preferred embodiment of the present invention in which the user defines the fixed data within the document utilizing a PDL form operator, desktop application 100 outputs a single PDL file 102 comprising a PDL prolog, which describes the forms within the document, and a body, which descibes the variable data. Returning to FIG. 2, the process proceeds from block 74 to blocks 76–80. Block 76 depicts a parser 108 within print server 40 parsing the PDL prolog within PDL file 102 to identify the forms to be rendered and parsing the PDL instructions describing the variable data. Next, utilizing the parsed prolog statements and parsed PDL instructions supplied by parser 108, RIP 110 generates a full page size raster (dot pattern) image of each of the fixed and variable data objects. In a preferred embodiment of the present invention, the raster image of a form is generated by executing the PostScript™ execform operator with the form's form dictionary as an operand. Execution of the execform operator invokes the PaintProc listed in the specified form dictionary, thus painting a full page raster image of the form. As depicted at block 78 of FIG. 2 and in FIG. 3, rasterized fixed data pages 112 and rasterized variable data pages 114 are stored separately within disk cache 44. Ripping each of rasterized fixed data pages 112 and rasterized variable data pages 114 to full page size permits rasterized variable data pages 114 to be easily merged with rasterized fixed data pages 112 during subsequent processing.

Returning to FIG. 2, following block 78 the process proceeds to block 80, which illustrates RIP 110 automatically generating a bookticket 116 that specifies how rasterized fixed data pages 112 and rasterized variable data pages 114 are to be merged. According to a preferred embodiment of the present invention, while processing the variable data, RIP 110 builds a table associating each form name with the rasterized variable data pages 114 to be presented together with that form. RIP 110 then converts the table contents into bookticket 116, which comprises a series of binary commands that instruct collator 120 how to merge rasterized fixed data pages 112 and rasterized variable data pages 114. Bookticket 116 is then stored within disk cache 44. Thus, RIP 110 processes PDL file 102 in a novel manner such that bookticket 116 can be automatically generated.

Referring again to FIG. 2, the process proceeds from block 80 to block 82, which depicts a collator program 112 within printer 50 accessing and merging rasterized fixed data pages 112 and rasterized variable data pages 114 in accordance with the information within bookticket 116 to produce collated document 122. Rasterized fixed data pages 112 and rasterized variable data pages 114 are merged by collator program 120 at print time by logically ORing rasterized fixed data pages 112 and rasterized variable data pages 114 on a dot-by-dot basis. Finally, as illustrated at block 84 of FIG. 2 and at references numerals 124 and 126 of FIG. 3, collated document 122 is printed by printhead 124 within printer 50 to produce printed document 126. Thereafter, the process illustrated in FIG. 2 terminates at block 86.

As has been described, the present invention provides an improved method and system for presenting a document including both fixed and variable data objects. The present invention simplifies the presentation of such documents by automatically generating a bookticket that specifies the manner in which separate raster images of fixed and variable data objects are to be merged. According to a preferred embodiment of the present invention, fixed data within a document is specified by the user utilizing a PDL form operator. A number of advantages obtain from utilizing a form operator to define the fixed data within the document. First, the desktop application utilized by the user to create the document outputs only a single PDL file containing both fixed and variable data, thereby simplifying the data stream communication between the user's computer system and the print server. In addition, the form pages defined by the PDL form operator can be easily cached by the RIP and accessed for subsequent reuse. Finally, the RIP can utilize form name invocations within the variable data to automatically generate a bookticket specifying the manner in which fixed and variable data pages are to be merged.

While the invention has been particularly shown and described with reference to a preferred embodiment, it will be understood by those skilled in the art that various changes in form and detail may be made therein without departing from the spirit and scope of the invention. For example, although the present invention has been described with reference to a POD presentation environment, those skilled in the art will appreciate that the present invention can also be advantageously applied to other presentation environments. Furthermore, although aspects of the present invention have been described with respect to specific "method steps" implementable on a computer systems, in an alternate embodiment, the present invention may be implemented as a computer program product for use with a computer system. Those skilled in the art should readily appreciate that programs defining the functions of the present invention can be delivered to a computer via a variety of signal-bearing media, which include, but are not limited to: (a) information permanently stored on non-writable storage media (e.g., read only memory devices within a computer such as ROM or CD-ROM disks readable by a CD-ROM drive); (b) information alterably stored on writable storage media (e.g., a floppy diskette or hard disk drive); or (c) information conveyed to a computer through communication media, such as through a computer or telephone network. It should be understood, therefore, that such computer-usable media, when carrying computer readable instructions that direct the method functions of the present invention, represent alternative embodiments of the present invention.

What is claimed is:

1. A method within a data processing system of preparing a presentation-ready document, said method comprising:

in response to receipt of a document description including at least one page description language (PDL) instruction, said document description specifying both fixed data and variable data, processing said at least one PDL instruction to produce separate presentation-ready images containing only said fixed data and containing only said variable data, wherein a particular presentation-ready image of fixed data is intended for presentation in at least two pages of a presentation-ready document and is produced only a single time; and automatically generating a bookticket specifying an arrangement of said presentation-ready images of said fixed data and said variable data within a presentation-ready document.

2. The method of claim 1, and further comprising the step of creating said document description utilizing a user application.

3. The method of claim 2, wherein said fixed data are specified in said document description utilizing a PDL form operator.

4. The method of claim 1, and further comprising:
in response to receipt of said bookticket at a presentation device, building a presentation-ready document including said presentation-ready images of said fixed data and said variable data in said arrangement specified by said bookticket.

5. The method of claim 1, and further comprising the step of storing said presentation-ready images of said fixed data and said variable data following said processing of said at least one PDL instruction.

6. The method of claim 1, wherein said presentation-ready document is to be presented utilizing a presentation medium having a selected size, and wherein each of said presentation-ready images of said fixed data and said variable data has said selected size.

7. The method of claim 6, wherein said step of building a presentation-ready document comprises the step of building a presentation-ready document including a plurality of pages, wherein at least one page among said plurality of pages is composed of at least one of said presentation-ready images of said fixed data overlayed with at least one of said presentation-ready images of said variable data.

8. A data processing system for preparing a presentation-ready document, said data processing system comprising:
means, responsive to receipt of a document description including at least one page description language (PDL) instruction and specifying both fixed data and variable data, for processing said at least one PDL instruction to produce separate presentation-ready images containing only said fixed data and containing only said variable data, wherein a particular presentation-ready image of fixed data is intended for presentation in at least two pages of a presentation-ready document and is produced only a single time; and
means for automatically generating a bookticket specifying an arrangement of said presentation-ready images of said fixed data and said variable data within the presentation-ready document.

9. The data processing system claim 8, and further comprising:
a computer system coupled to said means for processing said at least one PDL instruction; and
a user application within said computer system, wherein said user application can be utilized to create said document description.

10. The data processing system of claim 9, wherein said document description specifies said fixed data utilizing a PDL form operator.

11. The data processing system of claim 8, and further comprising means, responsive to receipt of said bookticket, for building a presentation-ready document including said presentation-ready images of said fixed data and said variable data in said arrangement specified by said bookticket.

12. The data processing system of claim 8, and further comprising a memory, wherein said means for processing said at least one PDL instruction stores said presentation-ready images of said fixed data and said variable data within said memory.

13. The data processing system of claim 8, wherein each of said presentation-ready images produced by said means for processing said at least one PDL instruction has a same size.

14. The data processing system of claim 13, wherein said means for building a presentation-ready document comprises means for building a presentation-ready document including a plurality of pages, wherein at least one page among said plurality of pages is composed of at least one of said presentation-ready images of said fixed data overlayed with at least one of said presentation-ready images of said variable data.

15. A program product for use with a data processing system, said program product comprising:
a data processing system-usable medium;
first instruction code within said data processing system-usable medium, wherein in response to receipt of a document description including at least one page description language (PDL) instruction, said document description specifying both fixed data and variable data, said first instruction code causes said data processing system to process said at least one PDL instruction to produce separate presentation-ready images containing only said fixed data and containing only said variable data, wherein a particular presentation-ready image of fixed data is intended for presentation in at least two pages of a presentation-ready document and is produced only a single time; and
second instruction code within said data processing system-usable medium for causing said data processing system to automatically generate a bookticket specifying an arrangement of said presentation-ready images of said fixed data and said variable data within the presentation-ready document.

16. The program product of claim 15, wherein said first instruction code utilizes document descriptions that specify said fixed data with a PDL form operator.

17. The program product of claim 15, and further comprising third instruction code within said data processing system-usable medium, wherein in response to receipt of said bookticket, said third instruction code causes a data processing system to build a presentation-ready document including said presentation-ready images of said fixed data and said variable data in said arrangement specified by said bookticket.

18. The program product of claim 15, wherein said first instruction code causes said data processing system to store said presentation-ready images of said fixed data and said variable data within a memory.

19. The program product of claim 15, wherein said first instruction code causes said data processing system to produce presentation-ready images of fixed data and variable data that all having a same size.

20. The data processing system of claim 19, wherein said third instruction code causes said data processing system to build a presentation-ready document including a plurality of pages, wherein at least one page among said plurality of pages is composed of at least one of said presentation-ready images of said fixed data overlayed with at least one of said presentation-ready images of said variable data.

* * * * *